(12) United States Patent
Miyamura et al.

(10) Patent No.: US 10,734,021 B1
(45) Date of Patent: Aug. 4, 2020

(54) HIGH SPEED FILE COPY FROM TAPE USING BLOCK GROUPING

(71) Applicant: International Business Machines Corporation, Armonk, NY (US)

(72) Inventors: Tsuyoshi Miyamura, Yokohama (JP); Tohru Hasegawa, Tokyo (JP); Noriko Yamamoto, Tokyo (JP); Shinsuke Mitsuma, Higashimurayama (JP); Sosuke Matsui, Machida (JP); Hiroshi Itagaki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/548,684

(22) Filed: Aug. 22, 2019

(51) Int. Cl.
*G11B 15/00* (2006.01)
*G11B 5/55* (2006.01)
*G11B 5/02* (2006.01)
*G11B 27/10* (2006.01)
*G06F 3/06* (2006.01)

(52) U.S. Cl.
CPC ............ *G11B 5/5508* (2013.01); *G06F 3/061* (2013.01); *G06F 3/064* (2013.01); *G06F 3/0682* (2013.01); *G11B 5/02* (2013.01); *G11B 27/107* (2013.01); *G11B 2220/956* (2013.01)

(58) Field of Classification Search
CPC ......... G11B 27/36; G11B 20/00; G11B 20/12; G11B 15/005; G11B 15/46; G11B 15/52; G11B 5/584; G11B 5/588; G06F 3/0613; G06F 3/0643; G06F 3/0659; G06F 3/0683; G06F 3/0682; G06F 17/30091; G06F 2003/0698

USPC ........ 360/25, 31, 48, 53, 72.1, 73.04, 73.12, 360/77.12
See application file for complete search history.

(56) References Cited

U.S. PATENT DOCUMENTS

| 9,263,064 | B2 | 2/2016 | Katagiri et al. |
| 9,513,818 | B2 * | 12/2016 | Whitney ............... G06F 16/13 |
| 10,199,068 | B2 | 2/2019 | Abe et al. |
| 2016/0188236 | A1 | 6/2016 | Hasegawa et al. |

OTHER PUBLICATIONS

Real et al., "An I/O Scheduler for Dual-Partitioned Tapes," Conference: Networking, Architecture and Storage, Aug. 2015, pp. 1-10, retrieved from https://www.researchgate.net/publication/293654023_An_IO_scheduler_for_dual-partitioned_tapes.

* cited by examiner

*Primary Examiner* — Nabil Z Hindi
(74) *Attorney, Agent, or Firm* — Zilka-Kotab, P.C.

(57) ABSTRACT

A computer-implemented method, according to one approach, includes: receiving a request to read a plurality of files from a magnetic tape, and obtaining a tape directory which identifies regions on the magnetic tape in which the files are stored. The tape directory is used to map each of the files to one of the regions on the magnetic tape in which the respective file is stored. A first subset of the files stored in a same first region on the magnetic tape is also sorted into a first order. The computer-implemented method further includes simultaneously: sorting a second subset of the files stored in a same second region on the magnetic tape into a second order, and instructing a tape drive to read each of the files in the first subset according to the first order.

25 Claims, 14 Drawing Sheets

HIGH SPEED FILE COPY FROM TAPE USING BLOCK GROUPING

BACKGROUND

The present invention relates to data storage systems, and more particularly, this invention relates to accessing files stored on magnetic tape using block grouping.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. This has also led to increases in storage capacity for magnetic tapes as a whole. However, the development of small footprint, higher performance tape drive systems has created various challenges ranging from the design of tape head assemblies for use in such systems to actually accessing data stored on a magnetic tape.

For instance, the process of reading multiple files from different locations on a magnetic tape involves repositioning the magnetic head between the various physical locations that the files are stored. Conventional processes have performed these read operations such that the files are accessed in an order which corresponds to how the files themselves relate to each other. For example, File A is accessed first, File B is accessed second, File C is accessed third, etc. However, accessing files in this manner is often inefficient because of the repeated movements that are performed in order to seek the beginning of each file on the tape. Moreover, as the number of files being accessed increases, the amount of head repositioning performed by these conventional processes increases as well.

SUMMARY

A computer-implemented method, according to one approach, includes: receiving a request to read a plurality of files from a magnetic tape, and obtaining a tape directory which identifies regions on the magnetic tape in which the files are stored. The tape directory is used to map each of the files to one of the regions on the magnetic tape in which the respective file is stored. A first subset of the files stored in a same first region on the magnetic tape is also sorted into a first order. The computer-implemented method further includes simultaneously: sorting a second subset of the files stored in a same second region on the magnetic tape into a second order, and instructing a tape drive to read each of the files in the first subset according to the first order. In preferred instances, sorting the second subset of the files and instructing the tape drive to read each of the files in the first subset are further performed in parallel.

Performance is significantly improved by sorting files in a given subset simultaneously while files in another subset (which have already been sorted) are being read from the magnetic tape by the tape drive. This effectively reduces the amount of computing resources that are consumed at a given point in time by overlapping processing operations in addition to dividing the related computational complexity into region-sized chunks. Moreover, this process of simultaneously: sorting a next subset of the files stored in a same next region on the magnetic tape into a next order, and instructing a tape drive to read each of the files in the previous subset according to the previous order may be repeated in an iterative fashion, e.g., for any desired number of files.

In some instances, sorting a given subset of the files stored in a given region on the magnetic tape into a given order includes using a physical location of each file stored in the given region to determine the given order such that an amount of head repositioning performed by the tape drive while reading the files in the given order is minimized. This also results in an improvement to performance delays. For instance, a data access time experienced as a result of reading each of the files in the given subset according to the given order is less than a data access time experienced as a result of reading each of the files in the given subset in any order other than the given order. It follows that the computer-implemented method is able to access (e.g., read) a plurality of files from magnetic tape in a more efficient manner than conventionally achievable.

A computer program product, according to another approach, includes a computer readable storage medium having program instructions embodied therewith. The program instructions are readable and/or executable by a processor to cause the processor to: perform the foregoing method.

A system, according to yet another approach, includes: a processor, and logic integrated with the processor, executable by the processor, or integrated with and executable by the processor. The logic is configured to: perform the foregoing method.

Any of these approaches may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and approaches of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred approaches of magnetic storage systems, as well as operation and/or component parts thereof for accessing (e.g., reading) a plurality of files from magnetic tape in a more efficient manner than conventionally possible. Performance is improved preferred approaches by sorting files in a given subset simultaneously while files in another subset (which have already been sorted) are being read from the magnetic tape by the tape drive. This effectively reduces the amount of computing resources that are consumed at a given point in time by overlapping processing operations in addition to dividing the related computational complexity into region-sized chunks, e.g., as will be described in further detail below.

In one general approach, a computer-implemented method includes: receiving a request to read a plurality of files from a magnetic tape, and obtaining a tape directory which identifies regions on the magnetic tape in which the files are stored. The tape directory is used to map each of the files to one of the regions on the magnetic tape in which the respective file is stored. A first subset of the files stored in a same first region on the magnetic tape is also sorted into a first order. The computer-implemented method further includes simultaneously: sorting a second subset of the files stored in a same second region on the magnetic tape into a second order, and instructing a tape drive to read each of the files in the first subset according to the first order.

In another general approach, a computer program product includes a computer readable storage medium having program instructions embodied therewith. The program instructions are readable and/or executable by a processor to cause the processor to: perform the foregoing method.

In yet another general approach, a system includes: a processor, and logic integrated with the processor, executable by the processor, or integrated with and executable by the processor. The logic is configured to: perform the foregoing method.

Figure 1A:
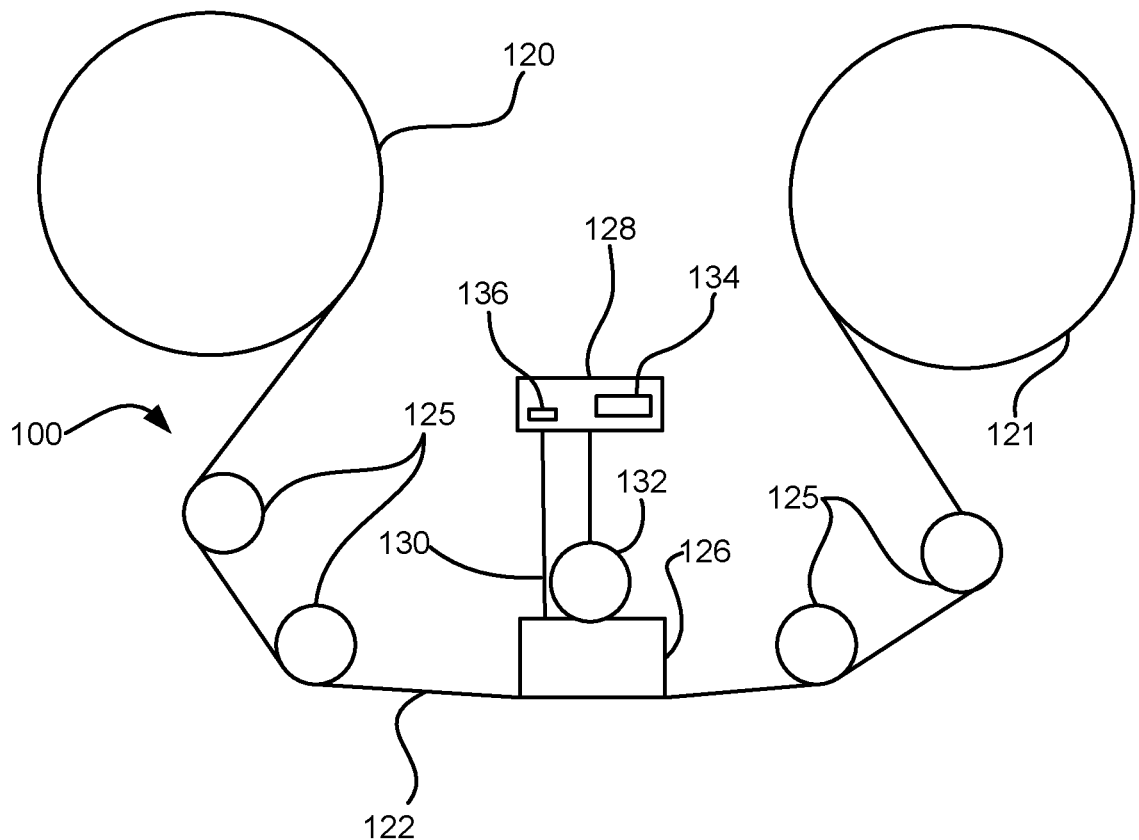
FIG. 1A is a schematic diagram of a simplified tape drive system according to one approach.

FIG. 1A illustrates a simplified tape drive 100 of a tape-based data storage system, which may be employed in the context of the present invention. While one specific implementation of a tape drive is shown in FIG. 1A, it should be noted that the approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
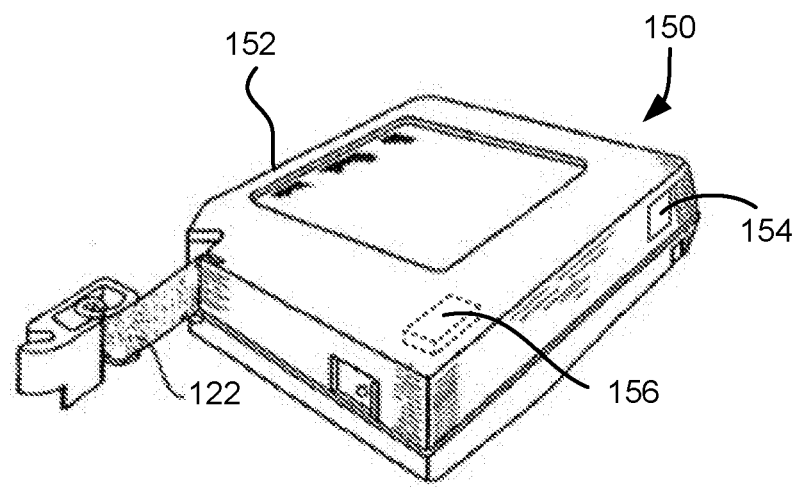
FIG. 1B is a schematic diagram of a tape cartridge according to one approach.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
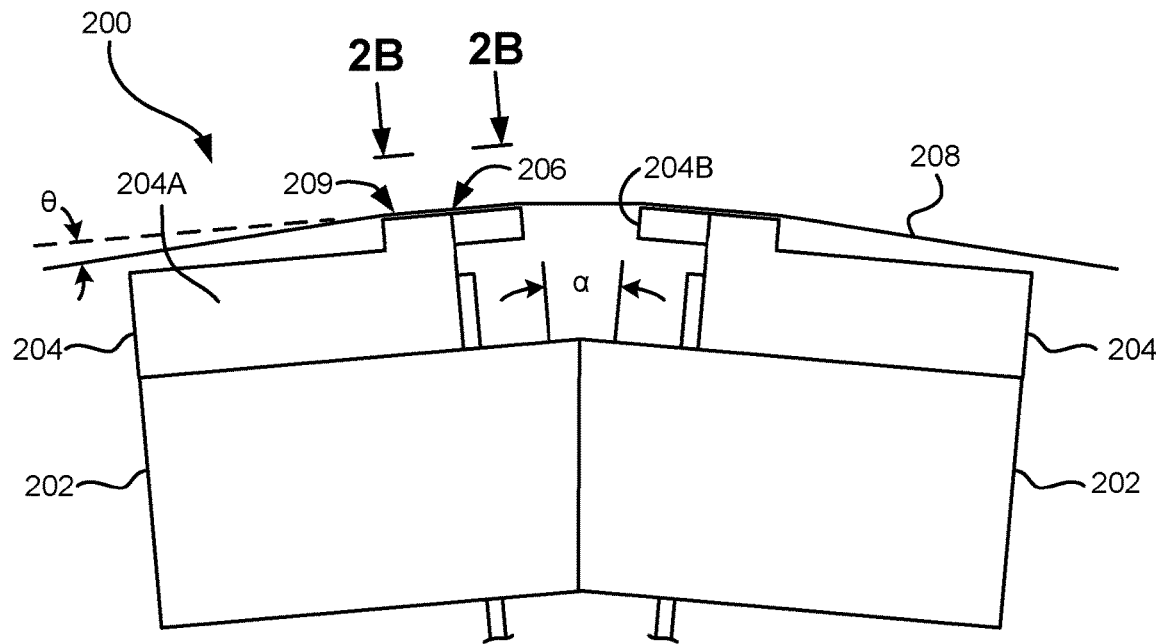
FIG. 2A illustrates a side view of a flat-lapped, bi-directional, two-module magnetic tape head according to one approach.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
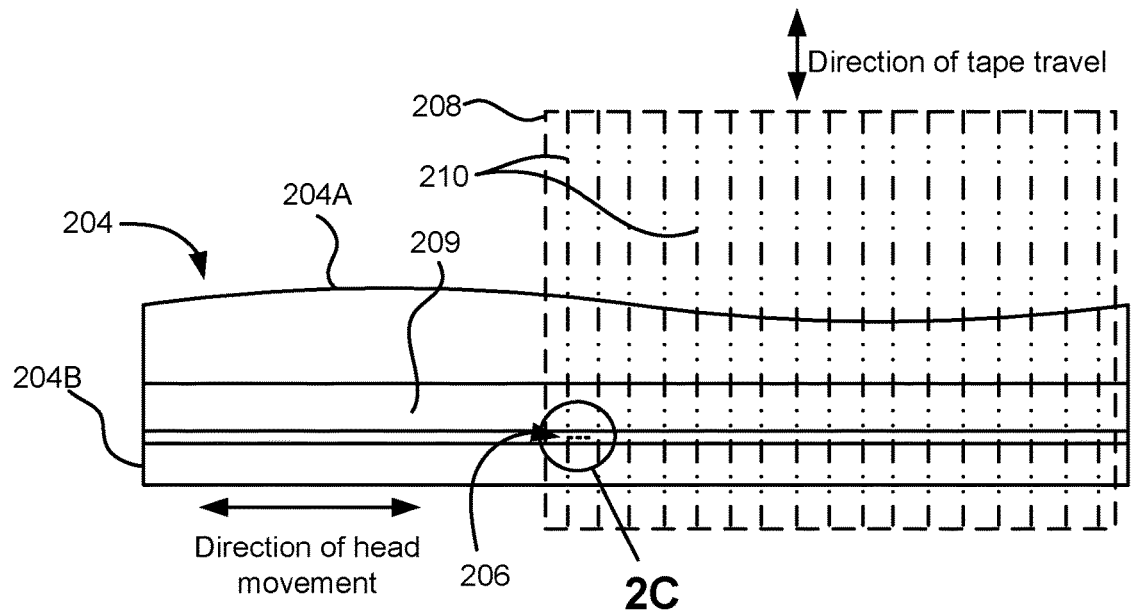
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
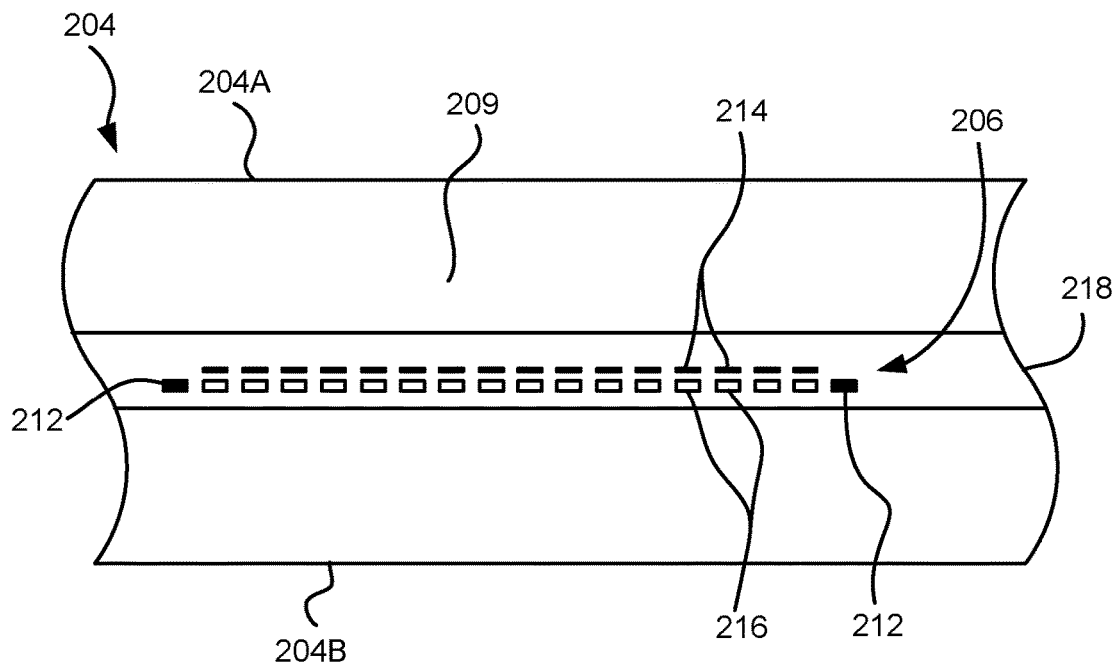
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
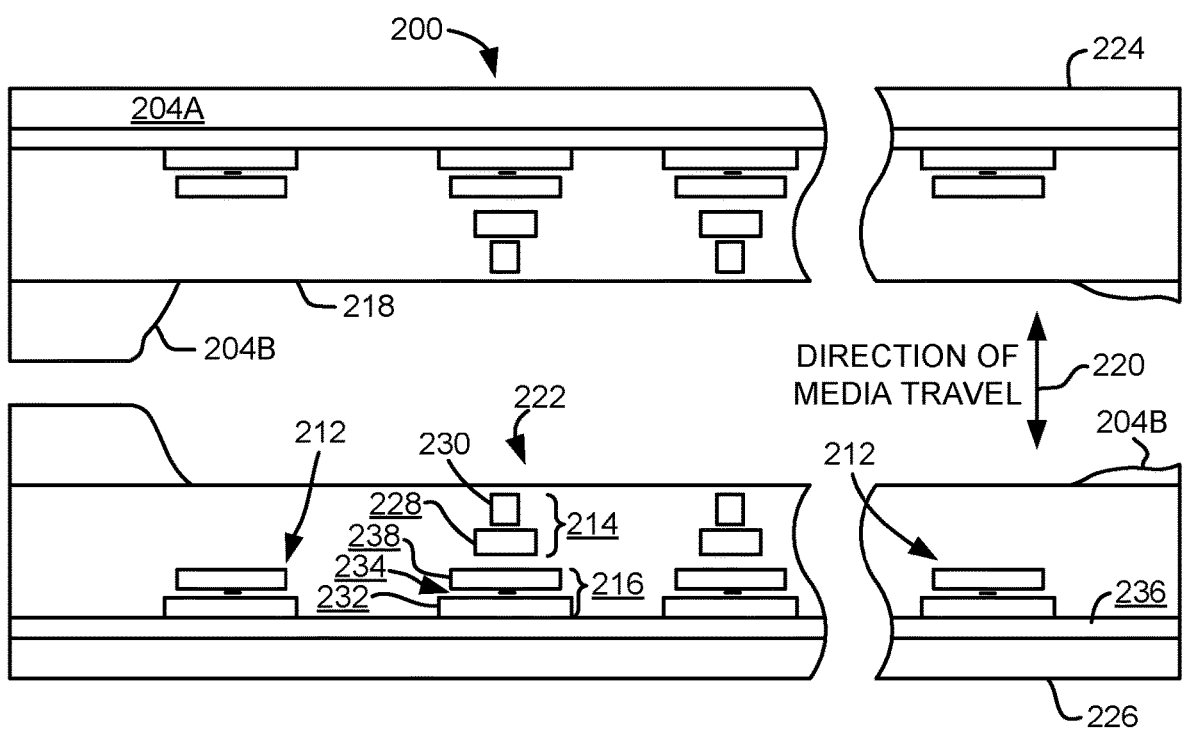
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
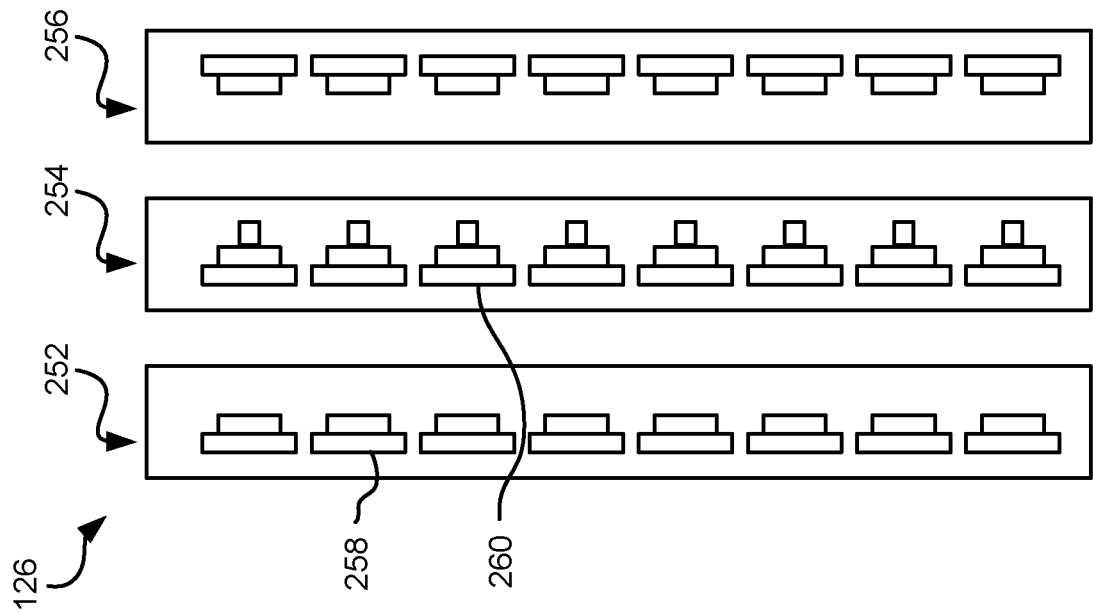
FIG. 4 is a partial tape bearing surface view of a magnetic head having a read-write-read configuration.
Figure 3:
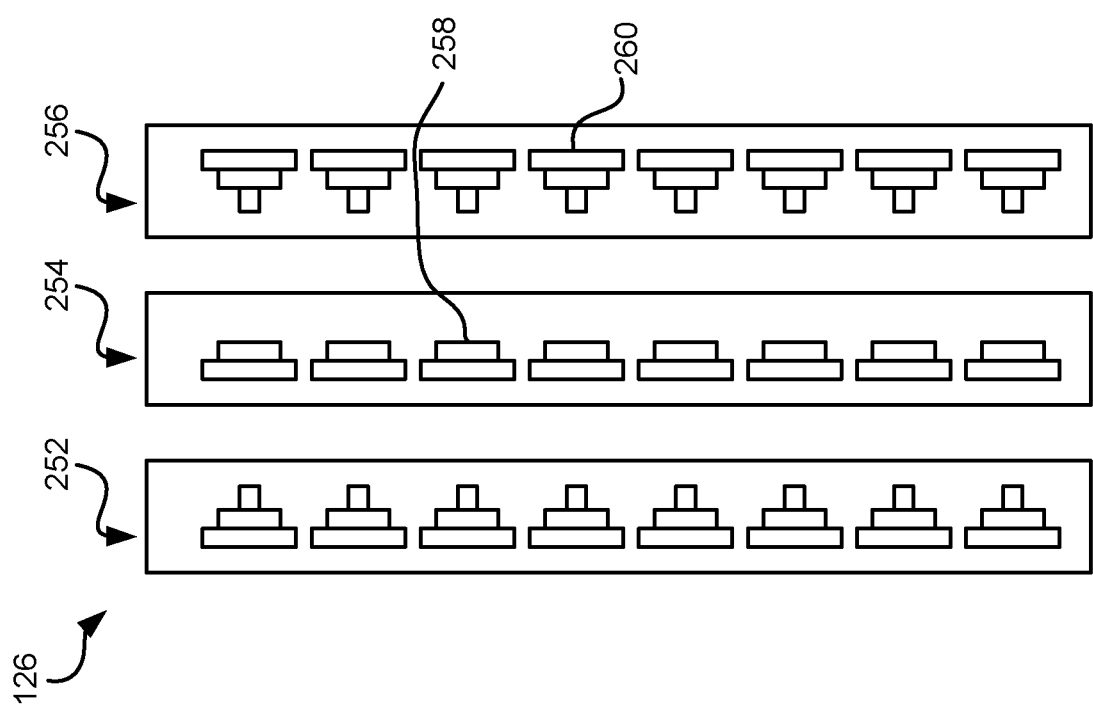
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
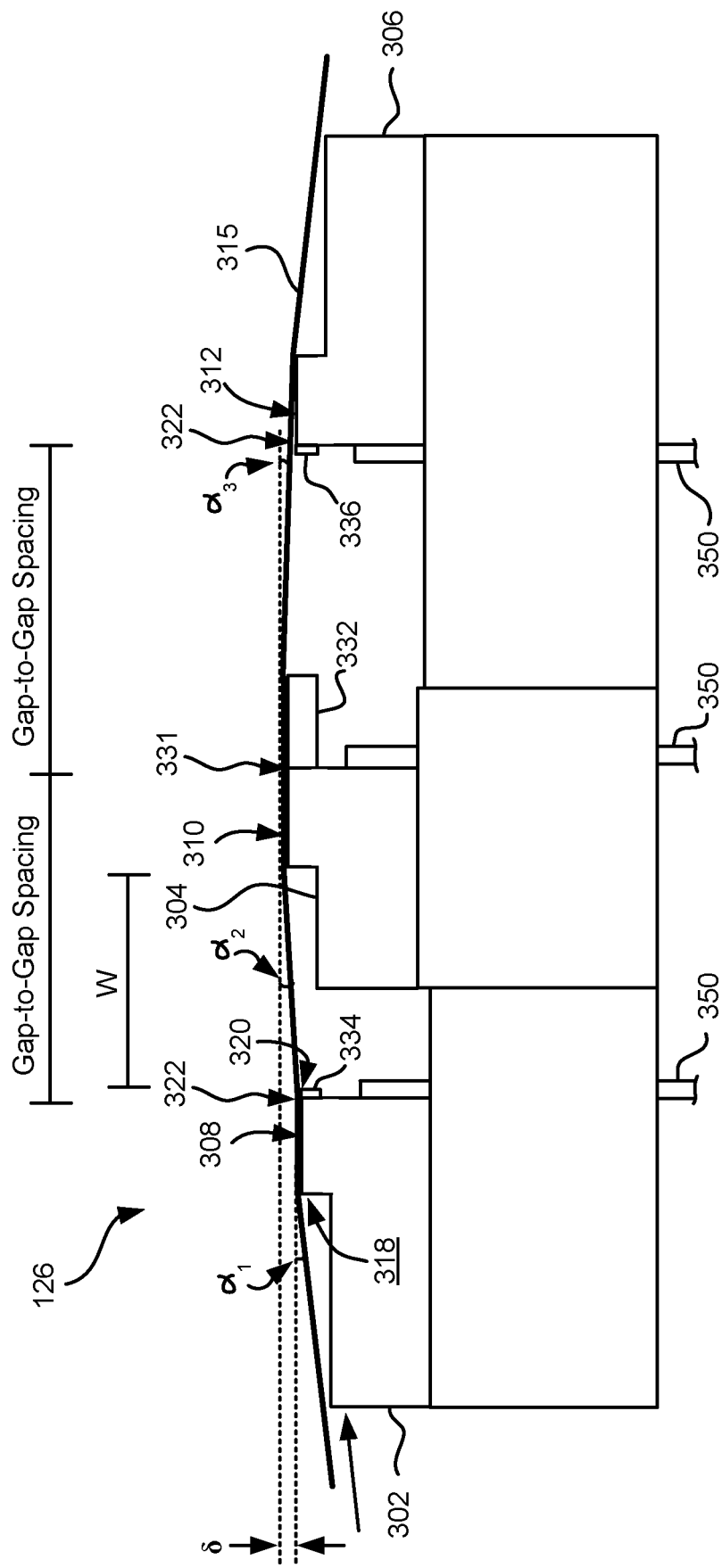
FIG. 5 is a side view of a magnetic tape head with three modules according to one approach where the modules all generally lie along about parallel planes.

FIG. 5 illustrates a magnetic head 126 according to one approach of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
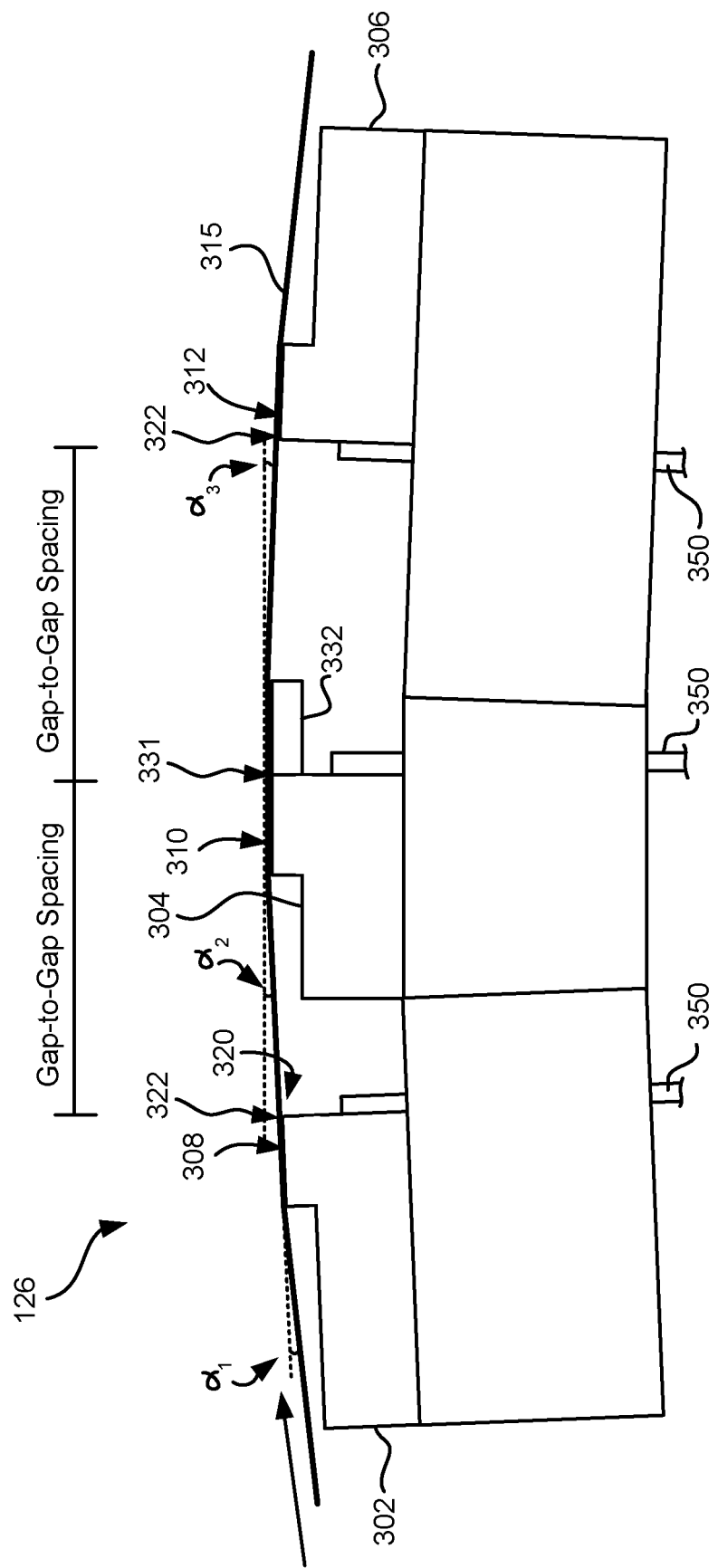
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
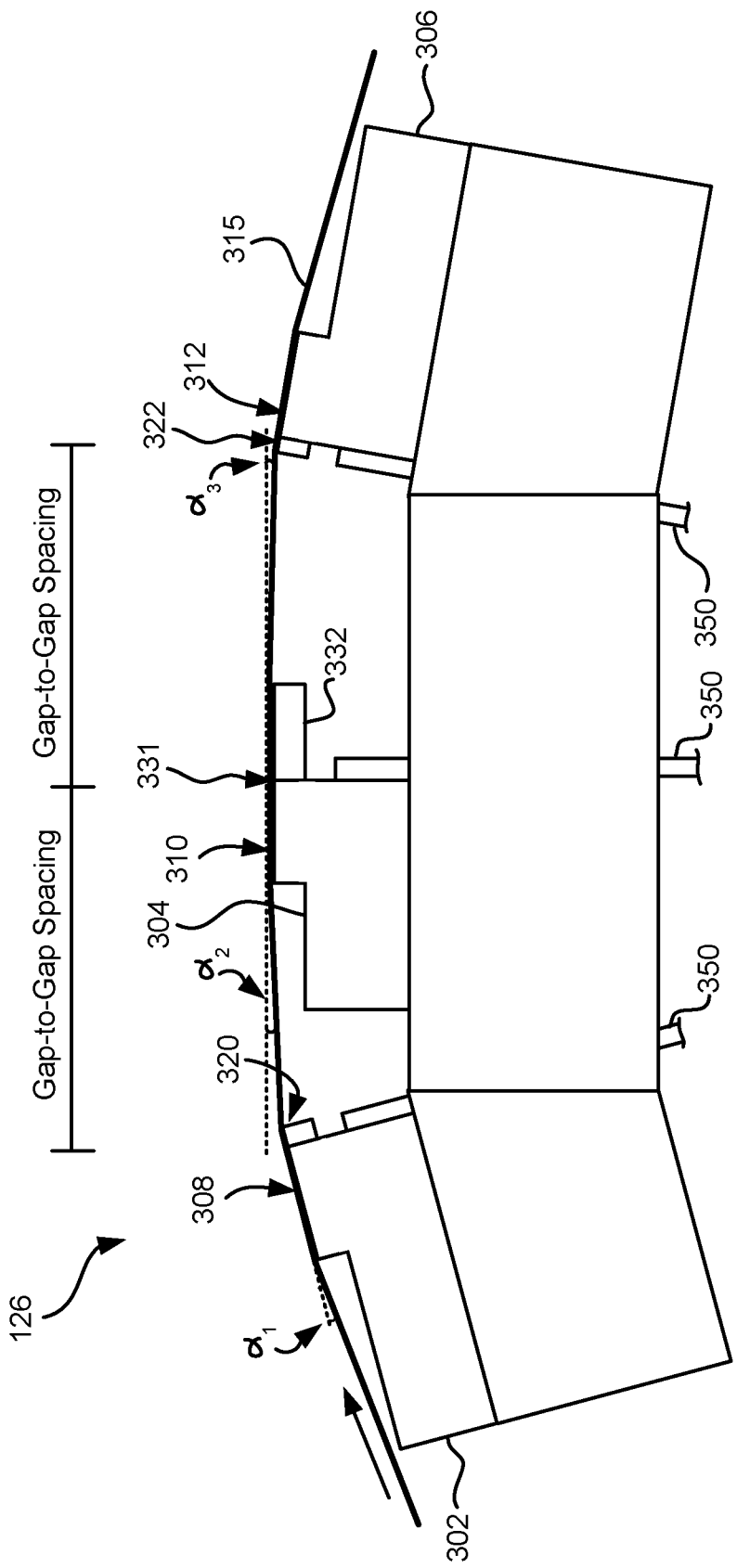
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
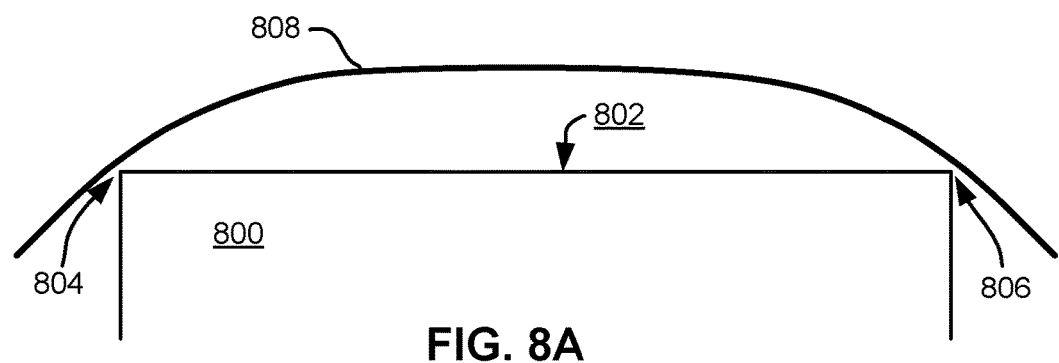
FIGS. 8A-8C are schematics depicting the principles of tape tenting.
Figure 8B:
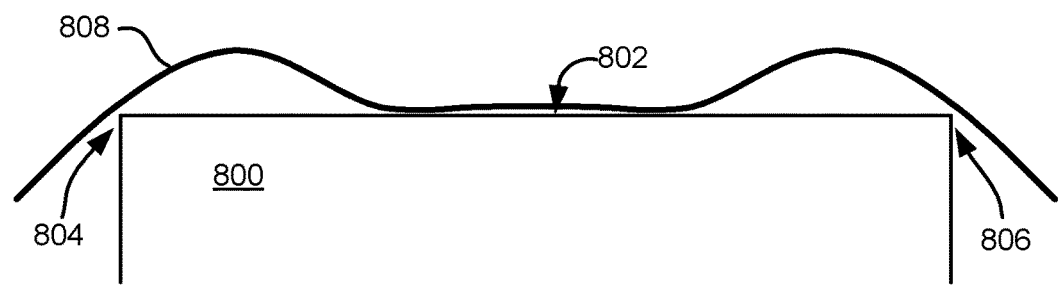
Figure 8C:
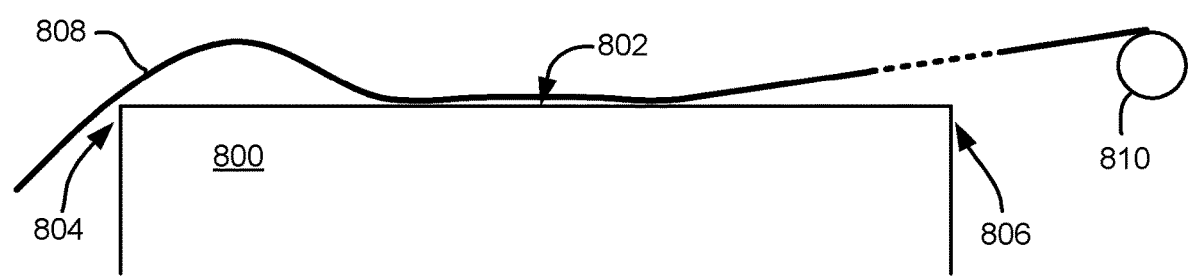

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various approaches herein can be implemented with a wide range of file system formats, including for example IBM Spectrum Archive Library Edition (LTFS LE). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
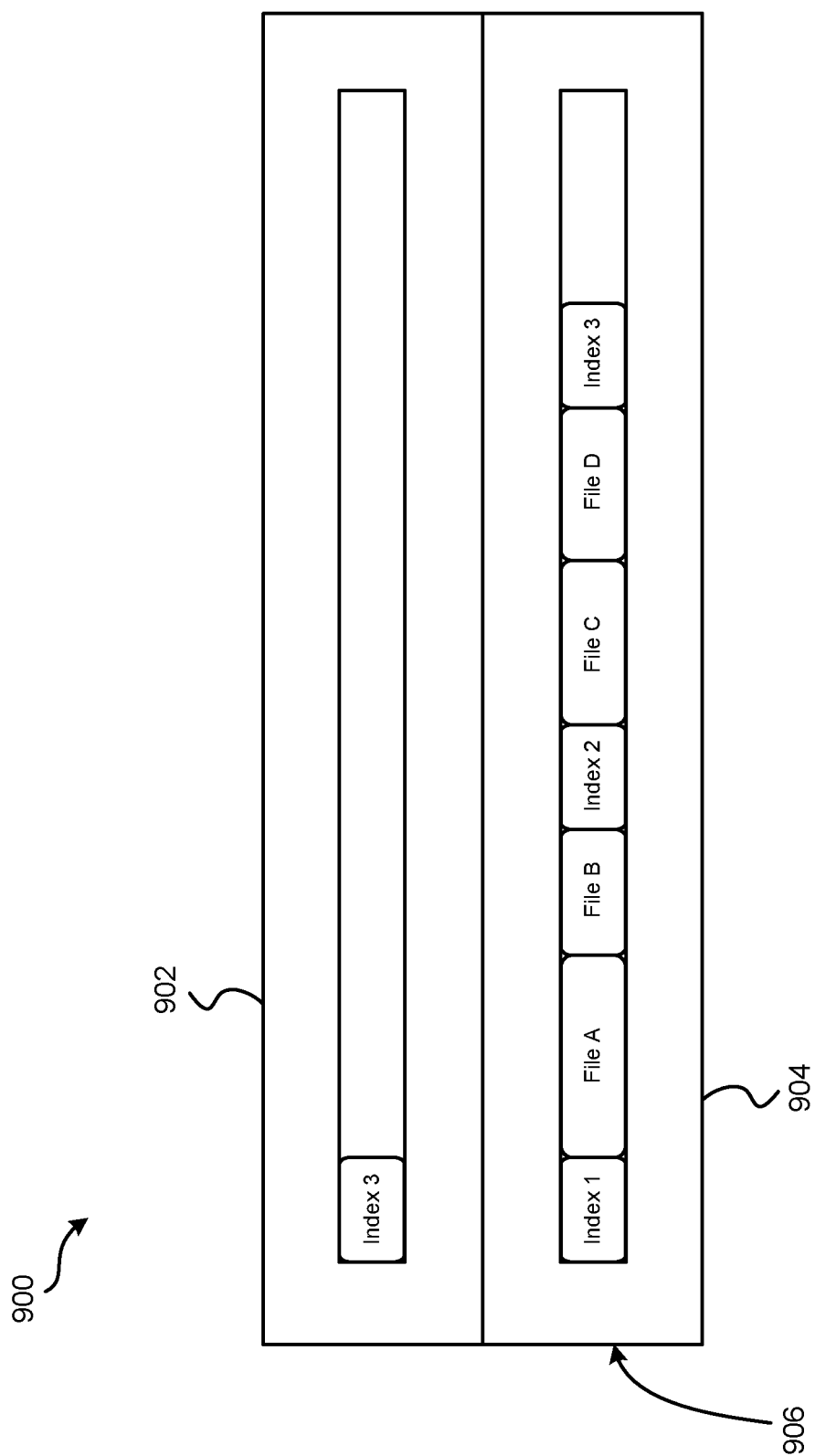
FIG. 9 is a representational diagram of files and indexes stored on a magnetic tape according to one approach.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As previously mentioned, the process of reading multiple files from different locations on a magnetic tape involves repositioning the magnetic head between the various physical locations that the files are stored. Conventional processes have performed these read operations such that the files are accessed in an order which corresponds to how the files themselves relate to each other. For example, File A is accessed first, File B is accessed second, File C is accessed third, etc. This is partly due to the fact that these conventional processes only reference record numbers of the file indices when evaluating the order in which to access the files. As a result, accessing files in this manner is often inefficient because of the repeated movements that are performed in order to seek the beginning of each file on the tape. This is particularly apparent in situations where the tape drive repeatedly rewinds the tape to access files that have already been passed. Moreover, as the number of files being accessed increases, the amount of head repositioning performed by these conventional processes increases as well, thereby further increasing data access times. For instance, magnetic tapes are capable of storing approximately 12 terabytes of uncompressed data. Moreover, the average size of a file written on a magnetic tape is about 10 megabytes, which translates to approximately 1,200,000 files being stored on a given magnetic tape.

In sharp contrast to these conventional shortcomings experienced by legacy implementations, various ones of the approaches included herein are able to access (e.g., read) a plurality of files from magnetic tape in a more efficient manner. These improvements are achieved as a result of sorting files that are to be accessed into a specific order which minimizes the amount of repositioning that is performed by a tape drive while actually reading the files. Additionally, various ones of the approaches included herein divide the various files that are to be accessed into different groups (or portions) based on their respective physical storage location on the magnetic tape. This allows for a group of files to be sorted while simultaneously accessing each of the files in another group. As a result, not only are the number of head repositioning operations reduced, but the efficiency by which computational resources are utilized during the process of sorting the files is also improved, e.g., as will be described in further detail below.

Figure 10:
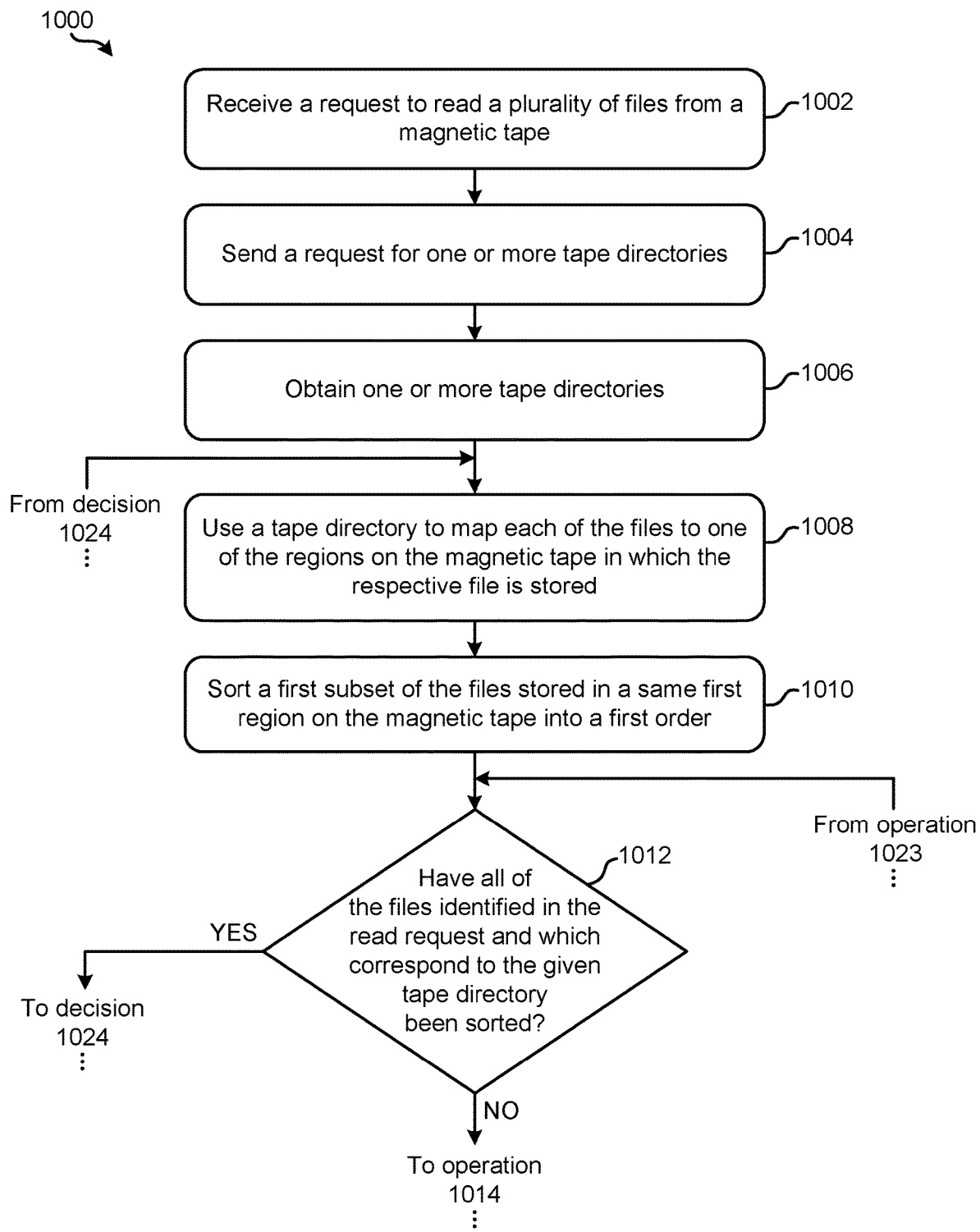
FIG. 10 is a flowchart of a method according to one approach.
Figure 10:
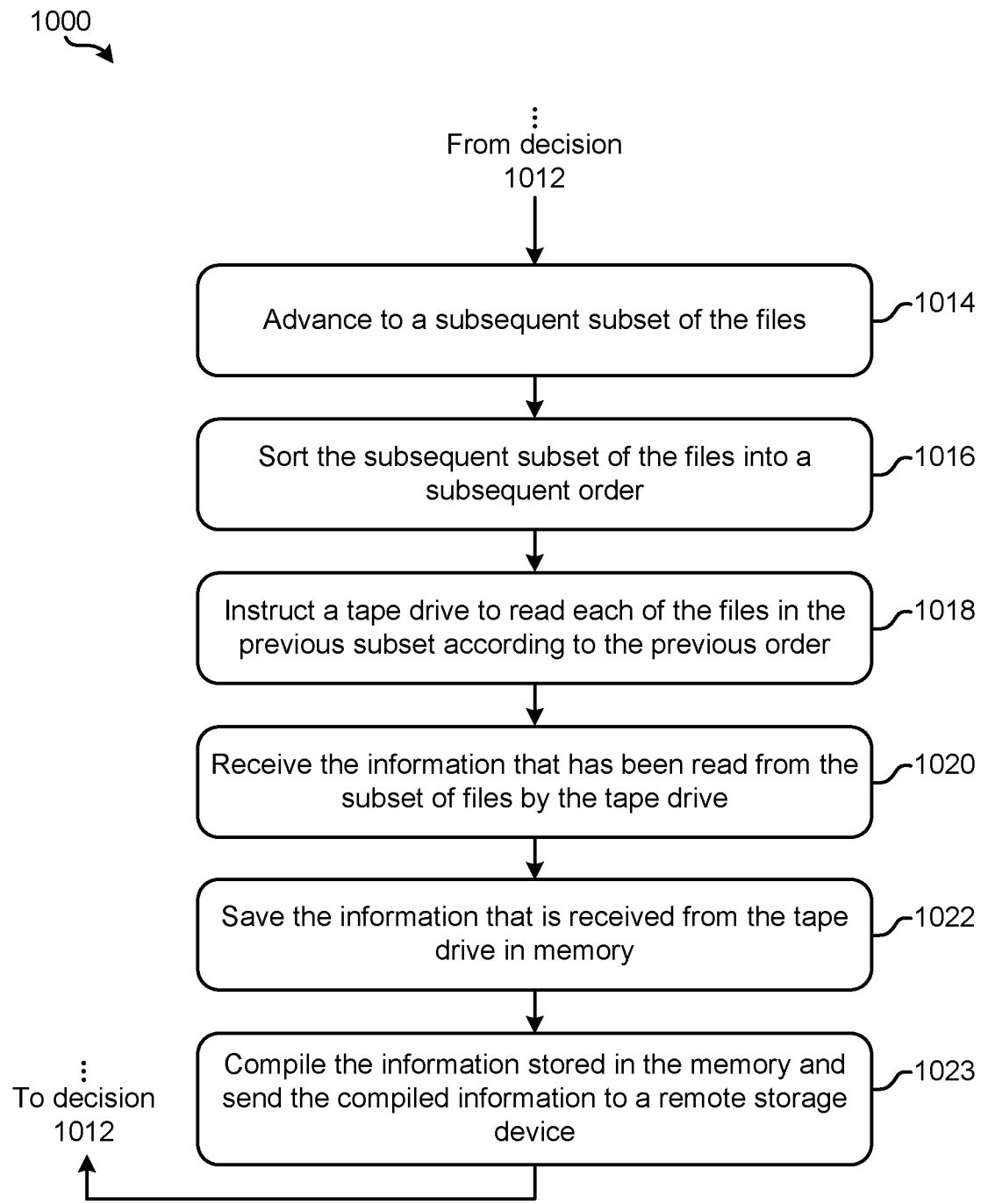
Figure 10:
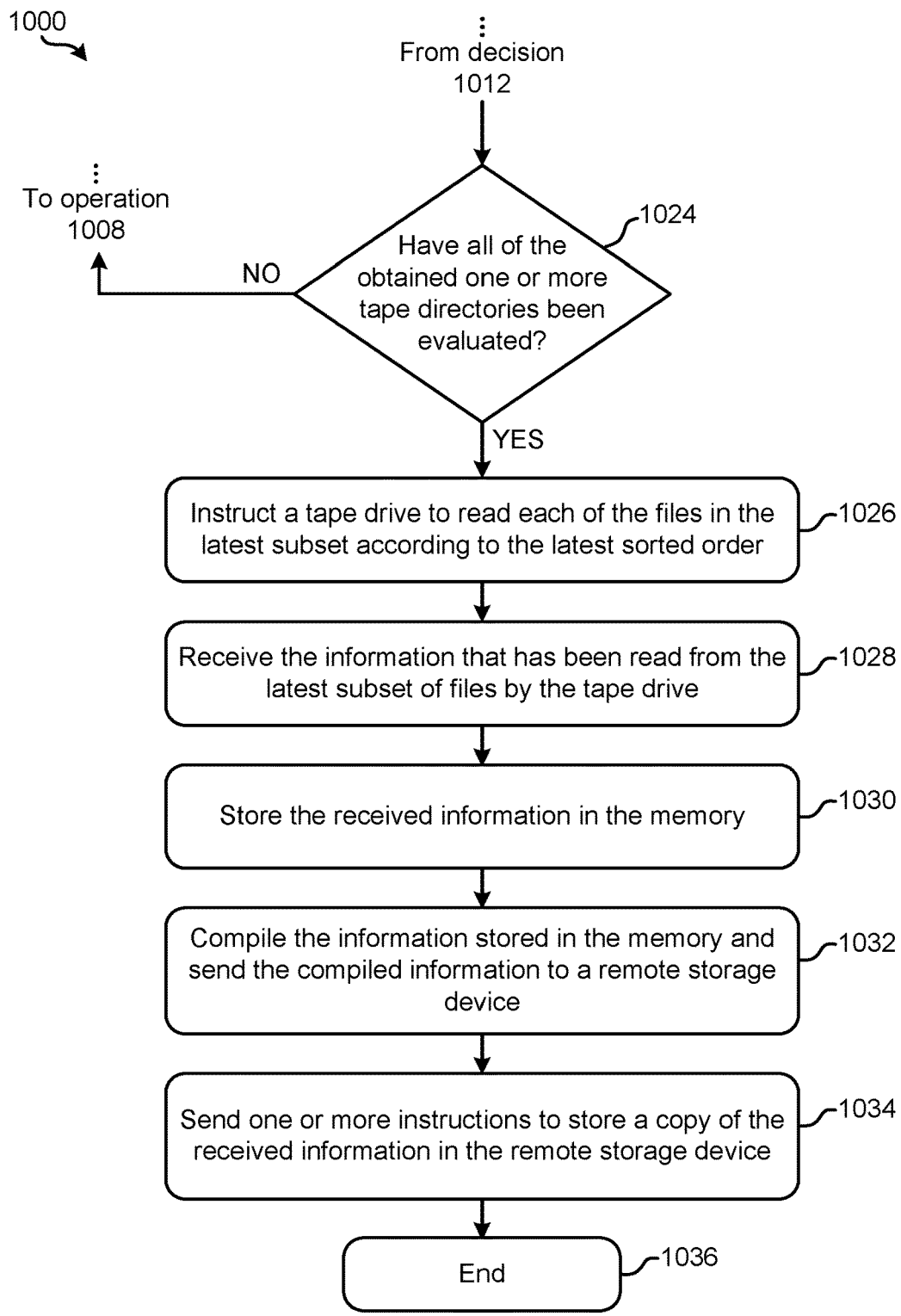

Referring now to FIG. 10, a flowchart of a method 1000 for copying multiple files specified in a read request is shown according to one approach. The method 1000 may be performed in accordance with the present invention in any of the environments depicted in FIGS. 1A-9, among others, in various approaches. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various approaches, the method 1000 may be partially or entirely performed by a controller, a processor, a computer, etc., or some other device having one or more processors therein. Thus, in some approaches, method 1000 may be a computer-implemented method. In such approaches, the computer used to implement the method may include the tape drive itself or a portion thereof such as the controller, the tape, an external host, a server, etc. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, operation 1002 of method 1000 includes receiving a request to read a plurality of files from a magnetic tape. Depending on the approach, the request may be received from a user (e.g., a host), a running application, another storage device, etc. It should also be noted that the term "file" as used herein is in no way intended to be limiting. Rather, a "file" as used herein may refer to any desired grouping of information, e.g., such as a data object, a specific document (e.g., a word processing document), a predetermined amount of data and/or metadata, etc.

In response to receiving the request, operation 1004 includes sending a request for one or more tape directories, each of which include information that identifies regions on the magnetic tape in which the plurality of files are stored (e.g., written to). In other words, the tape directories identify the physical locations on the magnetic tape at which various files are stored, preferably including those specified in the received request.

In some approaches tape directories are stored in memory included in and/or coupled to a tape drive used to access magnetic tapes. In other approaches, a tape directory may be stored as information in a cartridge memory, on a magnetic tape itself as housekeeping data originally, etc. It follows that the memory on which the tape directories are stored is in no way limited to one or more memory chips on the tape drive and/or host server. Accordingly, the request for the tape directories sent in operation 1004 is sent by the host server to one or more tape drives in some approaches. However, the request for the tape directories may be sent to any desired location, e.g., depending on where the tape directory is stored and/or is accessible from.

Operation 1006 further includes obtaining one or more tape directories. As noted above, in some approaches the request for one or more tape directories is sent from one or more tape drives that store the tape directories. It follows that obtaining the tape directories may simply involve receiving the tape directories from the one or more tape drives in some approaches. According to an exemplary approach, which is in no way intended to limit the invention, the one or more tape directories may be obtained by specifying the desired tape directories using a newly defined buffer identification associated with the directories, and read the terminal disclaimers from the tape drive using a read buffer command. In other approaches the tape directories may be obtained as a result of directly accessing a memory in which the tape directories are stored.

Moreover, operation 1008 includes using a first of the one or more tape directories to map each of the files to one of the regions on the magnetic tape in which the respective file is stored. In some approaches, the record number of each file may be used in combination with the tape directory to map each of the files to their respective region on the magnetic tape. Files written to a magnetic tape are accessed on a record basis. These records are sequentially numbered logically in order from the beginning of the tape. However, because the tape drive writes the files (e.g., data) on the magnetic tape while compressing the records, the position of the files written on the tape vary depending on the type of data and the compressibility thereof. It follows that a prediction may be made as to the physical location of a file on the magnetic tape using the information included in the tape directory when the record is specified and a seeking request is received for that file.

According to an exemplary approach, which is in no way intended to limit the invention, using the tape directory and/or the record number of each file to map each of the files to one the regions on the magnetic tape in which the respective file is stored includes identifying a range of blocks that correspond to the given file. The block ranges for the various files may be identified using any information and/or processes which would be apparent to one skilled in the art after reading the present description. For instance, in some approaches the record numbers of the files may be used to determine the respective block ranges. Moreover, the given file is assigned to a region on the magnetic tape which includes the range of blocks that correspond to the given file, e.g., as would be appreciated by one skilled in the art after reading the present description.

According to other approaches, identifying a range of blocks that correspond to the given file may involve obtaining a range of blocks that belong to an extent which describes the first record number and/or size on the file. This may be achieved by using an interface of the respective file system in some approaches. Moreover, the block range of all files on the file system may further be used to determine the desired order in which the plurality of files are read, e.g., as will be described in further detail below. It should also be noted that when an extent belongs to multiple tape directories, the extent is preferably divided into multiple block ranges of extent which correspond to the breaks of each tape directory, e.g., as would be appreciated by one skilled in the art after reading the present description. The divided extents are thereafter treated as belonging to the respective block ranges. Obtaining metadata which corresponds to the files may also be performed in an effort to identify the range of blocks that correspond to the given file.

With respect to the regions that are used herein, the magnetic tape may be effectively divided into a number of regions, each of which correspond to a different physical section (e.g., area) of the magnetic tape. For instance, the magnetic tape may be effectively divided into two regions along the tape length direction in some approaches. Each of these regions may be represented in a same tape directory in some approaches, while in other approaches a tape directory may be established for each subset of the regions, respectively. According to an example which is in no way intended to limit the invention, a magnetic tape having a length of about 1,000 meters may provide a tape directory for each 500 meter long section (e.g., half) of the magnetic tape. In some approaches the magnetic tape may further be divided based on the wraps of the magnetic tape. It follows that an entire magnetic tape having 208 wraps may be divided into a total of 416 regions when accounting for the fact that the tape may further be divided into two sections along its length as described above. Thus, in some approaches each region on a magnetic tape corresponds to one half of a full wrap on the magnetic tape.

In some approaches a record number written last is also stored in each region of the tape directory. Thus, when the record number is specified for a file of interest, a tape drive may be able to reference a tape directory in order to determine a region on the magnetic tape in which the file of interest is stored. In other words, the tape directory may be used to determine the physical storage location for a file of interest. The physical storage location may further be used to instruct the tape drive to adjust the relative position between a magnetic head and the magnetic tape such that the file of interest may be read. According to some approaches, the tape drive advances and/or rewinds the magnetic tape at a relatively fast speed (e.g., performs a coarse lookup) until reaching a position on the magnetic tape that is sufficiently close to the physical location at which the file of interest is stored. At this point, the tape drive may reduce the speed by which the tape is being advanced and/or rewound (e.g., perform a fine lookup) such that the data written on the tape may even be read until the file of interest is located.

As noted above, operation 1008 includes using the first of the one or more tape directories to map each of the files to one of the regions on the magnetic tape in which the respective file is stored. Accordingly, operation 1008 groups the requested files such that those files which are stored in the same region are included in a same subset. Referring still to FIG. 10, operation 1010 further includes sorting a first subset of the files stored in a same first region on the magnetic tape into a first order. In other words, the files that are stored in a same region and which have been assigned to a same subset are preferably organized in a specific order. It should be noted that the files in the first subset are not physically sorted into (e.g., rewritten in) a first order on the magnetic tape, but rather a determination is made as to a preferred order that the files in the first subset will be accessed.

Again, various ones of the approaches included herein are able to access (e.g., read) a plurality of files from magnetic tape in a more efficient manner than has been conventionally achievable. These improvements are realized as a result of sorting files that are to be accessed into a specific order which minimizes the amount of repositioning of the magnetic tape that is performed by a tape drive while actually reading the files. Accordingly, operation 1010 preferably sorts the files in the first subset such that a data access time experienced as a result of reading each of the files in the first subset according to the first order is less than a data access time experienced as a result of reading each of the files in the first subset in any order other than the first order. This improved data access time results from using a physical location of each file stored in the first region to determine the order which minimizes the amount of head repositioning performed by the tape drive with respect to the magnetic tape while reading the files in the given order. In some approaches the files in the first subset are sorted into the first order using (e.g., based on) a first record number associated with each of the respective files as well.

From operation 1010, method 1000 advances to decision 1012 which includes determining whether all of the files identified in the read request and which correspond to the first tape directory have been sorted. In other words, decision 1012 determines whether each of the subsets of files that are represented in the first tape directory have been evaluated. In response to determining that at least one of the files has not yet been sorted, method 1000 proceeds to operation 1014. There, operation 1014 includes advancing to a subsequent (e.g., next) subset of the files. It should be noted that method 1000 may advance between the subsets of files in any desired order. Thus, with respect to the present description, a "subsequent subset of the files" may refer those files that are included in a region which is adjacent to the previously sorted region, in a region which includes a next-largest number of the requested files, etc.

Furthermore, operation 1016 includes sorting the subsequent subset of the files into a subsequent order. It is preferred that the subsequent subset of files is sorted based on the physical location of each file and/or a first record number associated with each of the files. However, the subsequent subset of files may be sorted into the subsequent order using any one or more of the approaches described above with respect to operation 1010.

As the number of requested files increase, the amount of computational complexity involved with sorting the requested files such that they are accessed (e.g., read) in an efficient manner increases as well. Thus, by sorting the files in each subset individually, method 1000 is able to process more than one subset of the files simultaneously and in parallel, thereby significantly improving operational efficiency. For instance, while the subsequent subset of files are being sorted in operation 1016, a tape drive is instructed to read each of the files in the previous subset (here the first subset) according to the previous order (here the first order). See operation 1018. One or more instructions may be sent to the tape drive specifying the specific order in which the files are to be read from the magnetic tape. However, the process of actually reading the files from the magnetic tape may be performed using any desired processes, e.g., such as those described herein with respect to FIGS. 1A-9.

Figure 11:
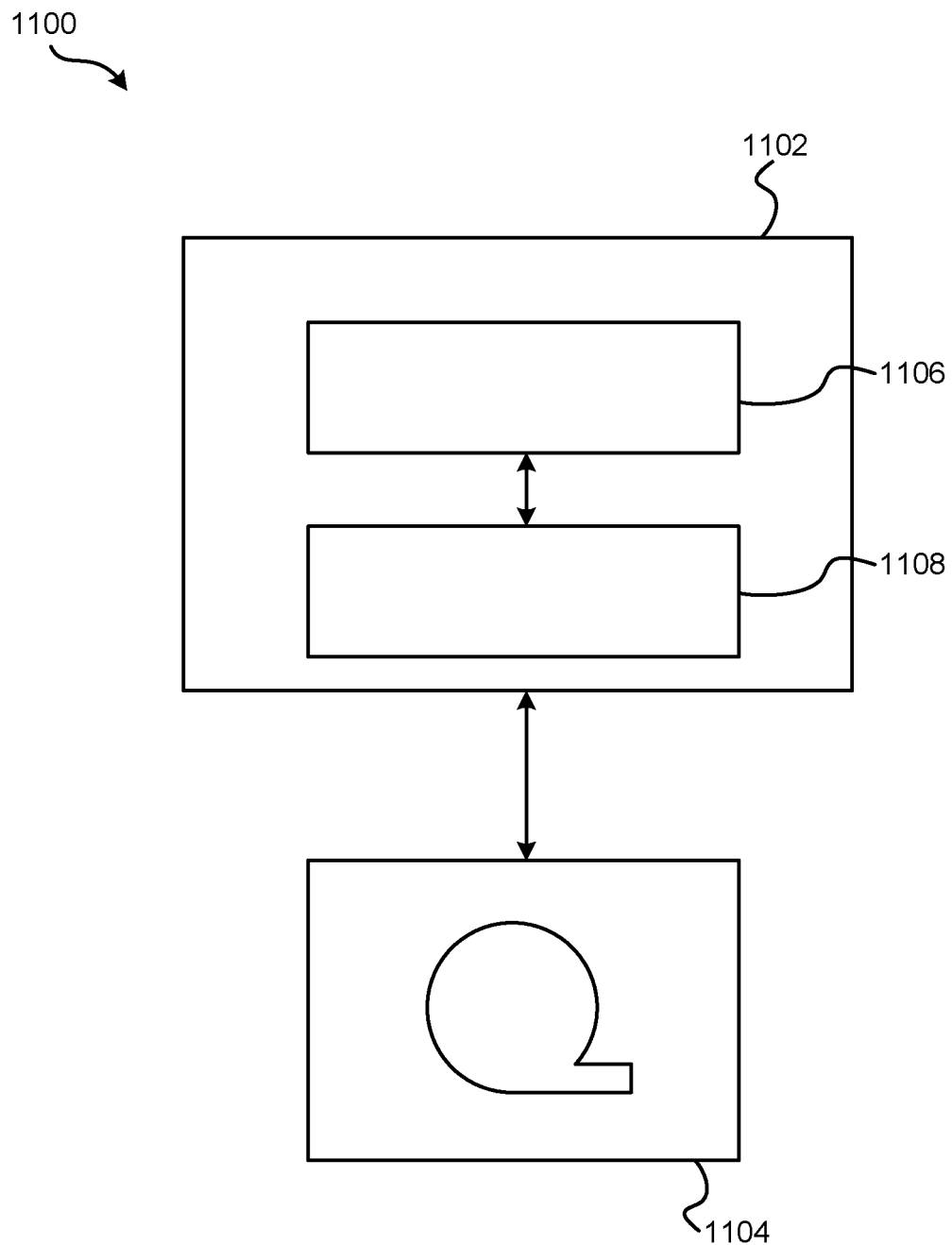
FIG. 11 is a partial representational view of a data storage system according to one approach.

It follows that operations 1016 and 1018 are preferably performed simultaneously and in parallel such that one subset of files is being sorted while another subset of files is actually being read in a previously determined order. Operations 1016 and 1018 may be performed simultaneously and in parallel using a same host server in some approaches (e.g., see 1102 of FIG. 11 below). However, in other approaches more than one server, processor, etc. may be implemented in order to perform the operations simultaneously and in parallel.

From operation 1018, method 1000 proceeds to operation 1020 which includes actually receiving the information (e.g., data, metadata, etc.) that has been read from the subset of files by the tape drive. In some approaches, the information may be received in a stream as the files are being read, while in other approaches the information read from all files in the subset may be sent by the tape drive as a packet in response to completing the read operations. Moreover, the information that is received from the tape drive is stored in memory (e.g., a cache, buffer, etc.). See operation 1022.

Optional operation 1023 further includes compiling the information that has been received from the tape drive and stored in the memory. The compiled information is also sent (e.g., transmitted) to a remote storage device. The remote storage device preferably corresponds to an intended target location for the copy of the information. It follows that in some approaches, the intended target location may be specified in the read request received in operation 1002. Furthermore, one or more instructions may be sent to the remote storage device to store a copy of the received information in the remote storage device, e.g., as will be described in further detail below.

From operation 1023, method 1000 returns to decision 1012 in order to repeat the determination as to whether all of the files identified in the read request and which correspond to the first tape directory have been sorted. In response to determining that there are still one or more of the files identified in the read request and which correspond to the first tape directory that have not yet been sorted, method 1000 proceeds to operation 1014 such that operations 1014-1022 are repeated for a next subsequent subset of files in addition to the previous subsequent subset. For instance, operation 1014 may be repeated such that a next subsequent subset of files may be advanced to, while operation 1018 may be repeated such that the previous subsequent subset of files may be read according to the previous subsequent order. It should be noted that "next subsequent subset of files" is referring to the next subset of files that follows the previously examined subset of files. Similarly, the "previous subsequent subset of files" is referring to the subset of files that was evaluated before proceeding to the "next subsequent subset of files." Accordingly, the terms "next subsequent" and "previous subsequent" are at least with respect to each other. It follows that processes 1012-1022 may be repeated any number of times, e.g., as an iterative process, depending on the number of files that are identified in the read request and which correspond to the first tape directory.

However, in response to determining that all of the files identified in the read request and which correspond to the first tape directory have been sorted, method 1000 proceeds to decision 1024. There, decision 1024 includes determining whether all of the one or more tape directories obtained in operation 1006 have been evaluated. In response to determining that at least one of the obtained tape directories has not yet been evaluated, method 1000 returns to operation 1008 such that a next one of the tape directories may be used to map each of the files to one of the regions on the magnetic tape in which the respective file is stored. It follows that any one or more of the approaches described above may be implemented to repeat operation 1008 as well as processes 1010-1022.

Returning to decision 1024, method 1000 proceeds to operation 1026 in response to determining that all of the obtained tape directories have been evaluated. There, operation 1026 includes instructing a tape drive to read each of the files in the latest subset according to the order formed in a last iteration of operation 1016. It follows that any one or more of the approaches described above with respect to operation 1018 may be implemented in order to perform operation 1026. Moreover, operation 1028 includes actually receiving the information that has been read from the latest subset of files by the tape drive, e.g., according to any of the approaches described above with respect to operation 1020. This received information is further stored in the memory with the other information received from the tape drive. See operation 1030. Any one or more of the approaches described above with respect to operation 1022 may be implemented while performing operation 1030, e.g., as would be appreciated by one skilled in the art after reading the present description.

Proceeding to operation 1032, the information that has been received from the tape drive and stored in the memory is compiled and sent (e.g., transmitted) to a remote storage device. As noted above, extents that extend across more than one tape directory may be divided accordingly, and treated as belonging to the respective block ranges. Accordingly, those files that are structured by one block range are generated using the single block range. However, files that are structured by multiple block ranges are preferably generated by filling the data of the block range at the corresponding offset and temporarily leaving the remaining portions void, e.g., using a sparse function. As additional block ranges which include at least another portion of such files are read and received, it is preferred that the at least one portion of the file is used to fill the missing portions and build the respective files. In other words, files that are structured by multiple block ranges are incrementally compiled as each of the corresponding blocks are read.

The remote storage device preferably corresponds to an intended target location for the copy of the information. In some approaches, the intended target location may be specified in the read request received in operation 1002. Furthermore, one or more instructions are sent to the remote storage device to store a copy of the received information in the remote storage device. See operation 1034. It follows that the remote storage device is preferably different than and separate from the magnetic tape from which the information was previously read. Thus, a backup copy of the requested information may be created for further use, redundant storage purposes, data migration, etc.

From operation 1034, the flowchart of FIG. 10 proceeds to operation 1036, whereby method 1000 may end. However, it should be noted that although method 1000 may end upon reaching operation 1036, any one or more of the processes included in method 1000 may be repeated in order to perform other read operations involving a plurality of files stored on magnetic tape. In other words, any one or more of the processes included in method 1000 may be repeated in order to perform subsequently received read requests.

It follows that the various processes included in method 1000 are able to access (e.g., read) a plurality of files from magnetic tape in a more efficient manner than conventionally possible. As previously mentioned, using a physical location of each file stored in a given region to determine the preferred order in which the files are read allows for the amount of head repositioning performed by the tape drive with respect to the magnetic tape while reading the files in the given order to be minimized. This also results in an improvement to performance delays. For instance, a data access time experienced as a result of reading each of the files in a given subset according to the order determined by the various processes in method 1000 is less than a data access time experienced as a result of reading each of the files in the same subset in any order other.

Performance is further improved by sorting files in a given subset simultaneously while files in another subset (which have already been sorted) are being read from the magnetic tape by the tape drive. This effectively reduces the amount of computing resources that are consumed at a given point in time by overlapping processing operations in addition to dividing the related computational complexity into region-sized chunks.

The processes included in method 1000 may be performed by any suitable component of the operating environment. For example, in various approaches, the method 1000 may be partially or entirely performed by a host server, controller, a processor, a computer, etc., or some other device having one or more processors therein. Looking now to FIG. 11, a data storage system 1100 which may be used to implement one or more of the processes included in method 1000 above is illustrated in accordance with one approach. It follows that the present data storage system 1100 may be implemented in conjunction with features from any other approach listed herein, such as those described with reference to the other FIGS., such as FIG. 10. However, such data storage system 1100 and others presented herein may be used in various applications and/or in permutations which may or may not be specifically described in the illustrative approaches listed herein. Further, the data storage system 1100 presented herein may be used in any desired environment. Thus FIG. 11 (and the other FIGS.) may be deemed to include any possible permutation.

As shown, the data storage system 1100 includes a server 1102 which is coupled to a tape drive 1104. With respect to the present description, it should be noted that "coupled to" is intended to indicate that the server 1102 is at least capable of communicating with the tape drive 1104. Accordingly, information, requests, commands, etc. may be sent between the server 1102 and the tape drive 1104. Depending on the approach, the server 1102 may be coupled to the tape drive 1104 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description.

In preferred approaches the server 1102 functions as a host server. Accordingly, the server 1102 includes an application module 1106 which may be used to run any number and/or type of applications. According to some approaches, the application module 1106 may perform one or more of the processes included in method 1000 of FIG. 10 above. With continued reference to FIG. 11, the application module 1106 is also coupled to a LTFS module 1108. The LTFS module 1108 is used to manage a LTFS which may be implemented on the server 1102 and/or the tape drive 1104. The LTFS is a file system in which a tape is recognized as a file, and which is able to recognize a record as a file on a file system with previously recorded metadata, e.g., such as a record number and/or a file name included in the file on the index. Accordingly, the LTFS module 1108 communicates with the tape drive through the device driver in some approaches. The application module 1106 may also read the file(s) specified by a user using an application programming interface of the file system 1100.

Data that is read from a magnetic tape may be copied to a target storage location, e.g., according to any of the approaches described herein. For instance, in some approaches a redundant copy of a plurality of files may be created on a different storage device such as an HDD. It follows that the various approaches described herein may be implemented in situations where data is being transferred between tiers of a multi-tiered data storage system.

Figure 12:
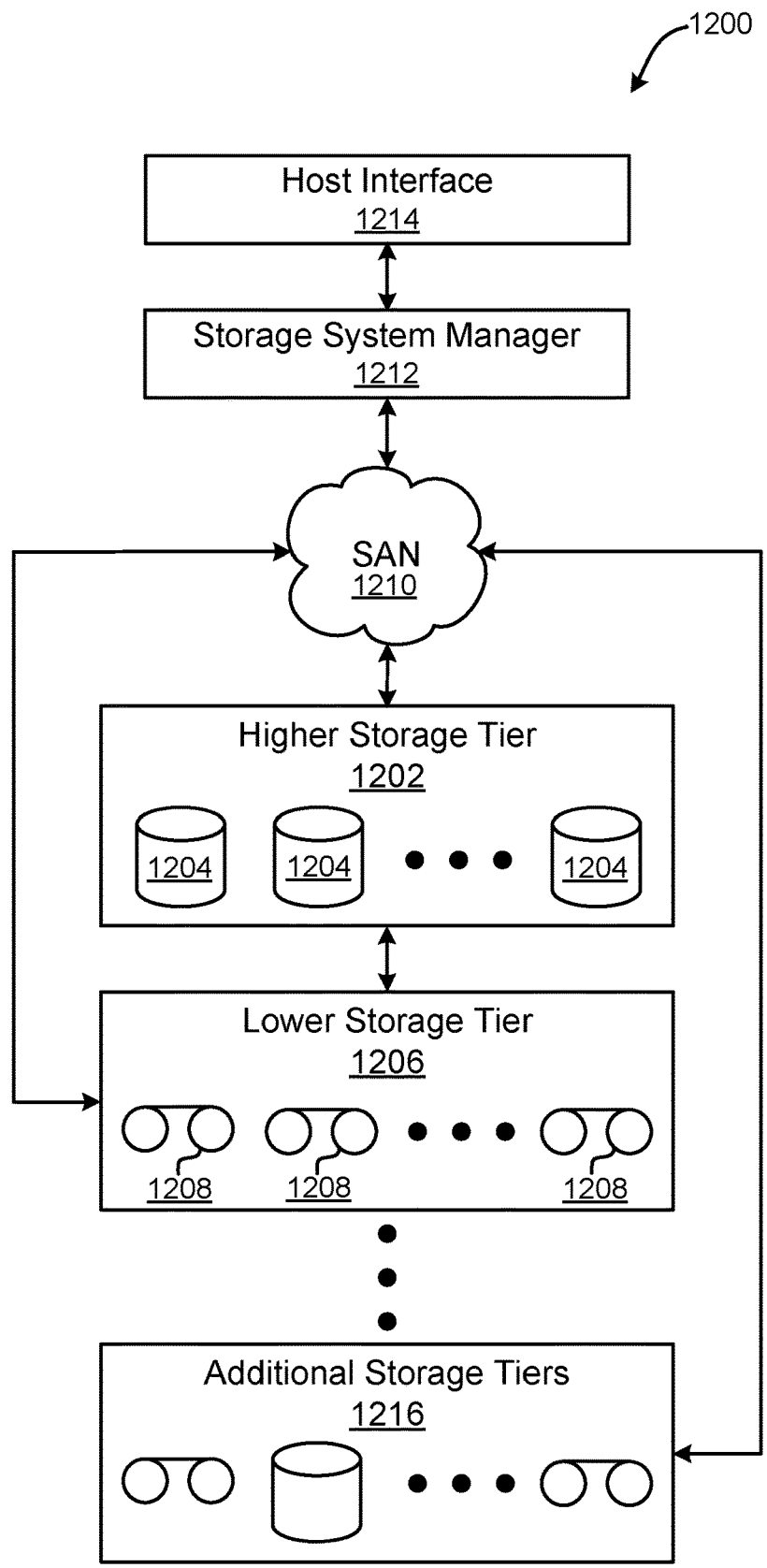
FIG. 12 is a representational view of a tiered data storage system according to one approach.

For instance, looking to FIG. 12, a storage system 1200 is shown according to one approach. Note that some of the elements shown in FIG. 12 may be implemented as hardware and/or software, according to various approaches. The storage system 1200 may include a storage system manager 1212 for communicating with a plurality of media and/or drives on at least one higher storage tier 1202 and at least one lower storage tier 1206. The higher storage tier(s) 1202 preferably may include one or more random access and/or direct access media 1204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 1206 may preferably include one or more lower performing storage media 1208, including sequential access media such as magnetic tape in tape drives and/or optical media, slower accessing HDDs, slower accessing SSDs, etc., and/or others noted herein or known in the art. One or more additional storage tiers 1216 may include any combination of storage memory media as desired by a designer of the system 1200. Also, any of the higher storage tiers 1202 and/or the lower storage tiers 1206 may include some combination of storage devices and/or storage media.

The storage system manager 1212 may communicate with the drives and/or storage media 1204, 1208 on the higher storage tier(s) 1202 and lower storage tier(s) 1206 through a network 1210, such as a storage area network (SAN), as shown in FIG. 12, or some other suitable network type. The storage system manager 1212 may also communicate with one or more host systems (not shown) through a host interface 1214, which may or may not be a part of the storage system manager 1212. The storage system manager 1212 and/or any other component of the storage system 1200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 1200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 1202, may include a majority of SSD storage media for storing data in a higher performing storage environment, and remaining storage tiers, including lower storage tier 1206 and additional storage tiers 1216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1202, while data not having one of these attributes may be stored to the additional storage tiers 1216, including lower storage tier 1206. Of course, one of skill in the art, upon reading the present descriptions, may devise many other combinations of storage media types to implement into different storage schemes, according to the approaches presented herein.

According to some approaches, the storage system (such as 1200) may include logic configured to receive a request to open a data set, logic configured to determine if the requested data set is stored to a lower storage tier 1206 of a tiered data storage system 1200 in multiple associated portions, logic configured to move each associated portion of the requested data set to a higher storage tier 1202 of the tiered data storage system 1200, and logic configured to assemble the requested data set on the higher storage tier 1202 of the tiered data storage system 1200 from the associated portions.

According to an in-use example which exemplifies the improvements achieved by the various approaches included herein, but which is in no way intended to limit the invention, a read request specifying 1,000,000 files (i.e., n=1,000,000) is received. Conventional processes for merely sorting this number of specified files has a computational complexity of O(n×log(n)). Accordingly, it can be estimated that sorting these 1,000,000 specified files into an order in which they should be read using conventional processes would take about 24 hours.

In sharp contrast, the various approaches introduced herein introduce processes for dividing the "n" files into "k" different regions at a computational complexity of O(n×log(k)). Although these computation complexities cannot simply be compared, in the case where "n" is equal to 1,000,000 and "k" is equal to 2 halves×208 wraps, or a total of 416 regions, it can be expected that the computation complexity can be reduced compared to the conventionally achievable computation complexity by the following percentage:

$$\frac{n\log k}{n\log n} = \log_n k = \frac{2.62}{6} = 43.7\%$$

It follows that some of the approaches included herein are able to sort the same 1,000,000 specified files into an order in which they should be read in the following amount of time: 24 hours×43.7%=10 hours and 29 minutes.

The computation complexity in each tape directory region may further be represented as $O((n/k) \times \log(n/k))$. However, the following equation further incorporates the computational efficiencies achieved as a result of sorting files simultaneously and in parallel with previously sorted files being read by a tape drive:

$$\frac{n/k \log n/k}{n \log n} = \frac{\log_n \frac{n}{k}}{k} = \frac{3.38}{416 \times 6} = 0.135\%$$

It follows that various ones of the approaches included herein are able to reduce computational complexity to just 0.135% of that experienced by conventional procedures for accessing a plurality of files on a magnetic tape. Following the foregoing example of conventional procedures taking about 24 hours to sort all 1,000,000 files, the approaches included herein are able to sort the files included in each tape directory in approximately 2 minutes. Moreover, tape drives are able to advance and/or rewind a magnetic tape at about 5.6 meters/second. Thus, a tape drive is able to read the data in files from a given tape directory region having a length of about 500 meters in approximately 1 minute and 30 seconds. Comparatively, a tape drive having half the height of a standard tape drive is able to cover the same 500 meters of magnetic tape in about 1 minute and 46 seconds at a reading speed of about 4.7 meters/second.

Since the sorting process for each of the tape directories is performed in parallel with the reading process of the files from tape in preferred approaches, an additional 15 to 30 seconds is used to perform the sorting process for a respective tape directory. Thus, if a subsequent reading process is initiated when the computation after the data is read from the magnetic tape is completed, a rewind of about 3 to 5 seconds is generated from the "stop" position to the reading "start" position, e.g., as would be appreciated by one skilled in the art after reading the present description. Therefore, it is desirable to predict the time involved with performing the computation in advance, and adjusting the advance or rewind speed of the magnetic tape.

According to an example, which again is in no way intended to limit the invention, computation times of about 118 seconds are experienced for tape speeds of about 4.23 meters/second, and about 129 seconds for tape speeds of about 3.87 meters/second. Moreover, the fine adjustments can also be made by combining multiple tape speeds. When 15 to 30 seconds are added for each region of the tape, the amount of time it takes to evaluate an entire magnetic tape is as follows: 15 seconds×208 regions=52 minutes, or alternatively 30 seconds×208 regions=104 minutes (1 hour and 44 minutes).

Combining these tape positioning delays with the file sorting achievements described above produces a total amount of time associated with performing a read operation that specifies 1,000,000 files as follows: (24 hours×43.7%)+ (52 minutes or alternatively 1 hour and 44 minutes)=11 hours and 21 minutes, or 12 hours and 13 minutes, depending on the amount of time that is incorporated for each region of the tape. Accordingly, it can be expected that the various approaches included herein are able to perform multi-file read and/or copy requests in about half the amount of time that conventional procedures are able to achieve the same result.

Again, these significant improvements are achieved, at least in part, as a result of utilizing tape directories. For instance, when a read or copy request specifying multiple files is received, categorization is performed on the basis of the regions in which the data of the respective files have been stored on the magnetic tape, particularly with reference to tape directories in advance. The tape drive is then able to sort the records for each region, and is then able to read the records in the sorted order while simultaneously sorting the files in a next region of the magnetic tape. According to an exemplary approach, which is in no way intended to limit the invention, a read and/or copy request is received which specifies a plurality of files which have been written on a magnetic tape. Subsequently, tape directory information is obtained from a tape drive, and the record number of each copy target file is inquired, followed by a categorization into a group corresponding tape directory region. Files which belong to a first tape directory region are then sorted by record number and physical location in the region. Once sorted, the files are read in the sorted order while simultaneously sorting the files in a subsequent region of the magnetic tape. Files are generated using the data read from the magnetic tape and eventually copied to the target storage location.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a request to read a plurality of files from a magnetic tape;
   obtaining a tape directory which identifies regions on the magnetic tape in which the files are stored;
   using the tape directory to map each of the files to one of the regions on the magnetic tape in which the respective file is stored;
   sorting a first subset of the files stored in a same first region on the magnetic tape into a first order; and
   simultaneously:
      sorting a second subset of the files stored in a same second region on the magnetic tape into a second order, and
      instructing a tape drive to read each of the files in the first subset according to the first order.

2. The computer-implemented method of claim 1, wherein sorting the second subset of the files and instructing the tape drive to read each of the files in the first subset are performed in parallel.

3. The computer-implemented method of claim 1, comprising:
   simultaneously:
      sorting a subsequent subset of the files stored in a same subsequent region on the magnetic tape into a subsequent order; and
      instructing the tape drive to read each of the files in the second subset according to the second order.

4. The computer-implemented method of claim 3, comprising:
   performing an iterative process which includes:
      determining whether all of the files have been sorted;
      in response to determining that one or more of the files have not been sorted, advancing to a next subsequent subset of the files; and
   simultaneously:
      sorting the next subsequent subset of the files stored in a same next subsequent region on the magnetic tape into a next subsequent order, and
      instructing the tape drive to read each of the files in the previous subsequent subset according to the previous subsequent order.

5. The computer-implemented method of claim 4, comprising:
   in response to determining that all of the files have been sorted, instructing the tape drive to read each of the files in the next subsequent subset according to the next subsequent order.

6. The computer-implemented method of claim 1, comprising:
   receiving information read from each of the files in the first subset;
   sending the received information to a storage device; and
   sending one or more instructions to store a copy of the received information in the storage device.

7. The computer-implemented method of claim 1, wherein each region corresponds to half of a full wrap on the magnetic tape.

8. The computer-implemented method of claim 1, wherein the computer-implemented method is performed by a host server that is coupled to the tape drive.

9. The computer-implemented method of claim 8, wherein the host server implements a Linear Tape File System (LTFS).

10. The computer-implemented method of claim 1, wherein using the tape directory to map each of the files to one the regions on the magnetic tape in which the respective file is stored includes:
    identifying a range of blocks that correspond to the given file; and
    assigning the given file to a region on the magnetic tape which includes the range of blocks that correspond to the given file.

11. The computer-implemented method of claim 1, wherein sorting a given subset of the files stored in a given region on the magnetic tape into a given order includes:
    using a physical location of each file stored in the given region to determine the given order such that an amount of head repositioning performed by the tape drive while reading the files in the given order is minimized.

12. The computer-implemented method of claim 1, wherein a data access time experienced as a result of reading each of the files in the first subset according to the first order is less than a data access time experienced as a result of reading each of the files in the first subset in any order other than the first order.

13. A computer program product comprising a computer readable storage medium having program instructions embodied therewith, the program instructions readable and/or executable by a processor to cause the processor to:
   receive, by the processor, a request to read a plurality of files from a magnetic tape;
   obtain, by the processor, a tape directory which identifies regions on the magnetic tape in which the files are stored;
   use, by the processor, the tape directory to map each of the files to one of the regions on the magnetic tape in which the respective file is stored;
   sort, by the processor, a first subset of the files stored in a same first region on the magnetic tape into a first order; and
   simultaneously:
      sort, by the processor, a second subset of the files stored in a same second region on the magnetic tape into a second order, and
      instruct, by the processor, a tape drive to read each of the files in the first subset according to the first order.

14. The computer program product of claim 13, wherein sorting the second subset of the files and instructing the tape drive to read each of the files in the first subset are performed in parallel.

15. The computer program product of claim 13, wherein the program instructions are readable and/or executable by the processor to cause the processor to:
   simultaneously:
      sort, by the processor, a subsequent subset of the files stored in a same subsequent region on the magnetic tape into a subsequent order; and
      instruct, by the processor, the tape drive to read each of the files in the second subset according to the second order.

16. The computer program product of claim 15, wherein the program instructions are readable and/or executable by the processor to cause the processor to:
   perform, by the processor, an iterative process which includes:
      determining whether all of the files have been sorted;
      in response to determining that one or more of the files have not been sorted, advancing to a next subsequent subset of the files; and
      simultaneously:
         sorting the next subsequent subset of the files stored in a same next subsequent region on the magnetic tape into a next subsequent order, and
         instructing the tape drive to read each of the files in the previous subsequent subset according to the previous subsequent order.

17. The computer program product of claim 16, wherein the program instructions are readable and/or executable by the processor to cause the processor to:
   in response to determining that all of the files have been sorted, instruct, by the processor, the tape drive to read each of the files in the next subsequent subset according to the next subsequent order.

18. The computer program product of claim 13, wherein the program instructions are readable and/or executable by the processor to cause the processor to:
   receive, by the processor, information read from each of the files in the first subset;
   send, by the processor, the received information to a storage device; and
   send, by the processor, one or more instructions to store a copy of the received information in the storage device.

19. The computer program product of claim 13, wherein each region corresponds to half of a full wrap on the magnetic tape.

20. The computer program product of claim 13, wherein the processor is a host server that is coupled to the tape drive.

21. The computer program product of claim 20, wherein the host server implements a Linear Tape File System (LTFS).

22. The computer program product of claim 13, wherein using the tape directory to map each of the files to one the regions on the magnetic tape in which the respective file is stored includes:
   identifying a range of blocks that correspond to the given file; and
   assigning the given file to a region on the magnetic tape which includes the range of blocks that correspond to the given file.

23. The computer program product of claim 13, wherein sorting a given subset of the files stored in a given region on the magnetic tape into a given order includes:
   using a physical location of each file stored in the given region to determine the given order such that an amount of head repositioning performed by the tape drive while reading the files in the given order is minimized.

24. The computer program product of claim 13, wherein a data access time experienced as a result of reading each of the files in the first subset according to the first order is less than a data access time experienced as a result of reading each of the files in the first subset in any order other than the first order.

25. A system, comprising:
   a processor; and
   logic integrated with the processor, executable by the processor, or integrated with and executable by the processor, the logic being configured to:
   receive, by the processor, a request to read a plurality of files from a magnetic tape;
   obtain, by the processor, a tape directory which identifies regions on the magnetic tape in which the files are stored;
   use, by the processor, the tape directory to map each of the files to one of the regions on the magnetic tape in which the respective file is stored;
   sort, by the processor, a first subset of the files stored in a same first region on the magnetic tape into a first order; and
   simultaneously:
      sort, by the processor, a second subset of the files stored in a same second region on the magnetic tape into a second order, and
      instruct, by the processor, a tape drive to read each of the files in the first subset according to the first order.

* * * * *